United States Patent

[11] 3,627,222

| [72] | Inventor | Andre Quenot<br>Besancon, France |
|---|---|---|
| [21] | Appl. No. | 798,857 |
| [22] | Filed | Jan. 30, 1969 |
| [45] | Patented | Dec. 14, 1971 |
| [73] | Assignee | Quenot & Cie S.a.r.L.<br>Besancon, France |
| [32] | Priority | Mar. 18, 1968 |
| [33] | | France |
| [31] | | 144243 |

[54] CLUTCH DEVICE FOR LINEAR MEASURING INSTRUMENTS WITH TAPE
8 Claims, 12 Drawing Figs.

[52] U.S. Cl. .................................................. 242/84.8,
242/96
[51] Int. Cl. .................................................. B65h 75/00
[50] Field of Search ........................................ 242/84.8,
96, 99; 192/84 PM

[56] References Cited
UNITED STATES PATENTS

| 2,746,691 | 5/1956 | Hoad ......................... | 242/84.52 B UX |
| 2,956,658 | 10/1960 | Jaeschke ...................... | 192/84 PM |
| 3,001,738 | 9/1961 | Quenot ......................... | 242/84.8 |
| 3,053,365 | 9/1962 | Allen ............................ | 192/84 PM |
| 3,312,319 | 4/1967 | Carroll et al. .................. | 192/84 PM X |

*Primary Examiner*—George F. Mautz
*Assistant Examiner*—Gregory A. Walters
*Attorneys*—Robert E. Burns and Emmanuel J. Lobato ABSTRACT: In a clutch device for linear measuring instruments, at least one of the driving and driven elements is equipped with magnetic members which can become secured against ferromagnetic members on the other element, wherein the driven and driving elements can be provided with antiskid means.

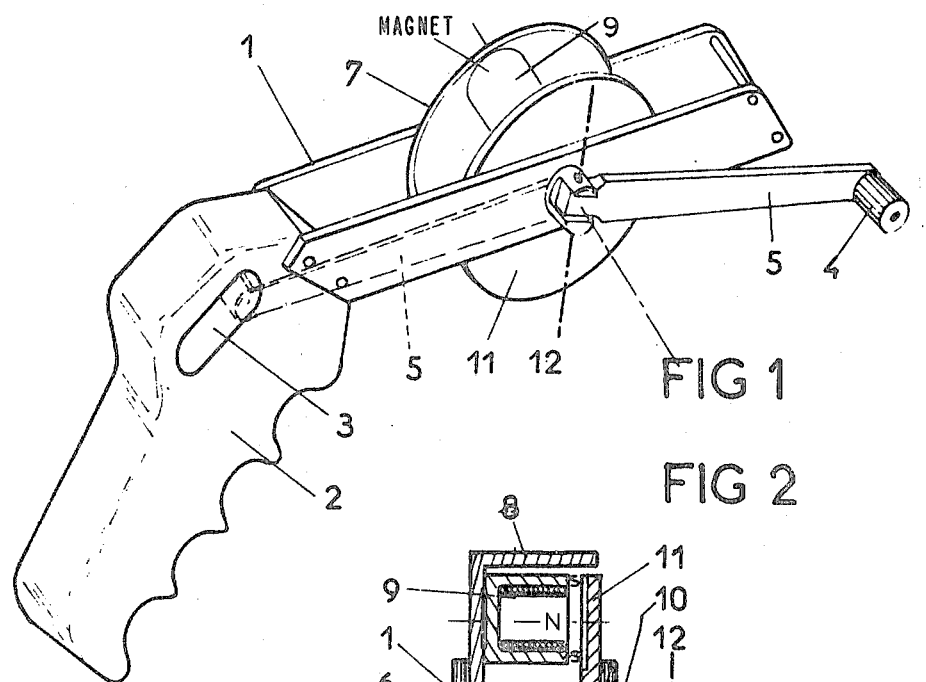
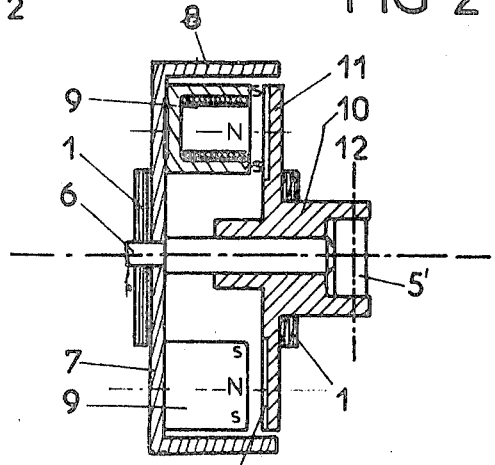
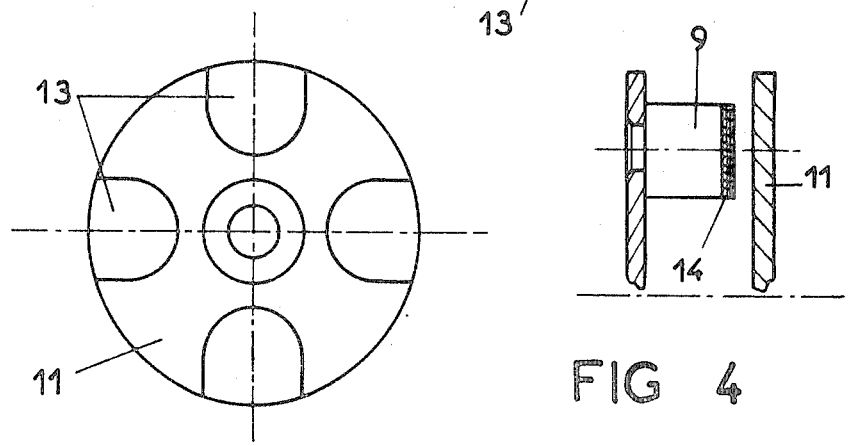
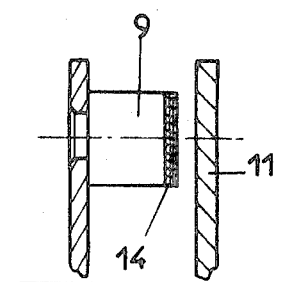

CLUTCH DEVICE FOR LINEAR MEASURING INSTRUMENTS WITH TAPE

Linear measuring instruments wound on a drum are often provided with a rewinding handle, particularly when these instruments have very long tapes such as those of a 10-meter length.

Owing to the considerable length of wound tape, there can occur in these instruments abrupt rotations of the drum when the tape is unwound, whereupon the handle is then driven in undesirable and often dangerous manner.

This drawback remains even when the handle is foldable around the shaft to be withdrawn in a housing of the drum since there always remains projections.

To remedy this drawback various clutch devices have been proposed which make it possible to disconnect the crank from the drum. However these devices are complicated and impracticable. Most of these devices utilize the interfitting of projecting and recessed elements which are fixed on the driving device and the driven drum. A particular substantial drawback is the necessity of making the projecting and the recessed elements coincide, thus requiring a precise relative positioning.

Consequently, the invention proposes to provide a clutch device for linear tape-measuring instruments which make it possible to eliminate the necessity of positioning the driving device relative to the driven drum retaining a simple design and foolproof operation.

To this effect, the invention is concerned with a clutch device for linear measuring instruments characterized in that at least one of the driving and driven elements is provided with magnetic members which can become fixed against corresponding ferromagnetic means of the other element, the said driving and driven elements having antiskid means.

The invention will be better understood by referring to the following description made by way of nonlimiting example and to the accompanying drawing in which:

FIG. 1 shows an assembled view of a decameter (or 10-meter tape-measuring device) clutch based on magnetic suction cups.

FIG. 2 shows an axial cross section of the decameter according to FIG. 1.

FIG. 3 shows the driving disc of the decameter according to FIG. 1.

FIG. 4 shows schematically a magnetic suction cup having an antiskid coating.

Figure 5:
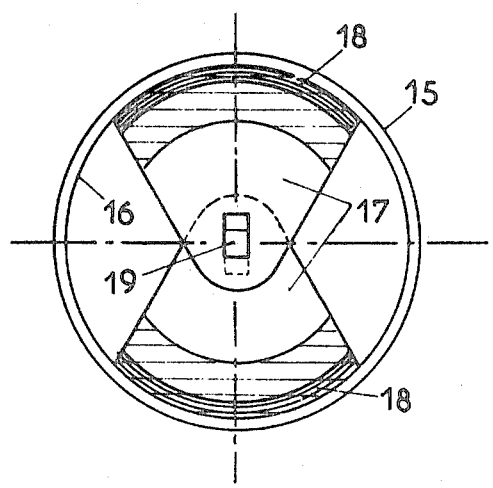
FIG. 5 shows schematically a clutch with magnetic shoes and a drum.

The linear measuring instrument, for example a decameter, comprises in known manner a frame 1 with a handle 2. An orifice 3 of this handle 2 enables it to receive the handle 4 of the crank 5 when the same is in folded position 5'.

Frame 1 is traversed by a shaft 6 which carries a flange 7 fast on a winding drum 8. Said flange 7, preferably of metallic material, carries a certain number of magnetic suction cups 9. A sleeve 10 is also mounted on shaft 6 in such a way as to freely slide on this shaft. Said sleeve 10 carries a metallic flange 11 positioned in front of the magnetic poles of magnets 9. Sleeve 10 emerges to the outside of frame 1 which supports it in such a way as to form a notch passed therethrough by shaft 12 around which can pivot the arm of crank 5.

The pivot pin 12 of the crank 5 is offset from in the middle plane of the arm of the crank in such a way that, as can be seen on FIG. 2, crank 5 by contacting the extremity of shaft 6 moves disc 11 from magnetic suction cups 9. This arrangement corresponds to the fold position of the crank 5.

On the contrary, when crank 5 is unfolded disc 11 can slide on shaft 6 and can apply itself against suction cups 9 thus clutching.

It is also possible to provide disc 11 with notches such as 13 in a number at least equal to that of suction cups 9. Thus if said suction cups 9 have not penetrated in the recesses 13 upon clutching they will penetrate therein upon the first sliding of discs 11 on said suction cups 9 making all later sliding impossible.

Reference is made to FIG. 4.

The magnetic suction cups 9 can be covered with an antiskid layer 14 for example of rubber; in this case, if adherence is sufficient, it is possible to eliminate recesses 13.

In all that has been said above it should be understood that suction cups 9 can be positioned on disc 11.

Reference is made to FIG. 5.

Winding drum 15 for the tape has an inner wall 16 which is cylindrical and is made of ferromagnetic material. Inside drum 15 are positioned one or several jaws 17 which carry magnetic frictional material on their periphery layers 18.

A suitable device, for example the insertion of a wedge in openings 19 of jaws 17 makes it possible to move jaws 17 toward wall 16. It is possible also to equip this wall 16 with axial projections (not shown) between which the jaws 17 can enter to avoid all sliding.

Figure 6:
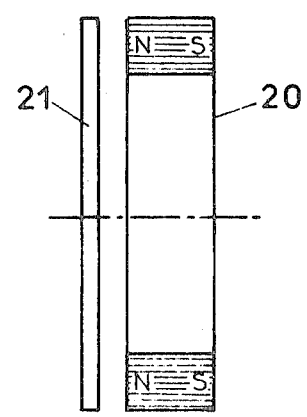
FIG. 6 shows schematically a clutch with annular magnet.

Reference is made to FIG. 6.

By way of modification the clutch device can comprise a disc 21 which is at least partially ferromagnetic and fast on a winding drum (not shown). Facing disc 21 is positioned adjacent an annular magnet 20 a suitable driving device. A control device of some sort makes it possible to bring together and move away magnet 20 and disc 21 thus effecting clutching and unclutching. To magnet 20 and/or disc 21 can be associated any antiskid means such as teeth, notches, rubber etc.

Figure 7:
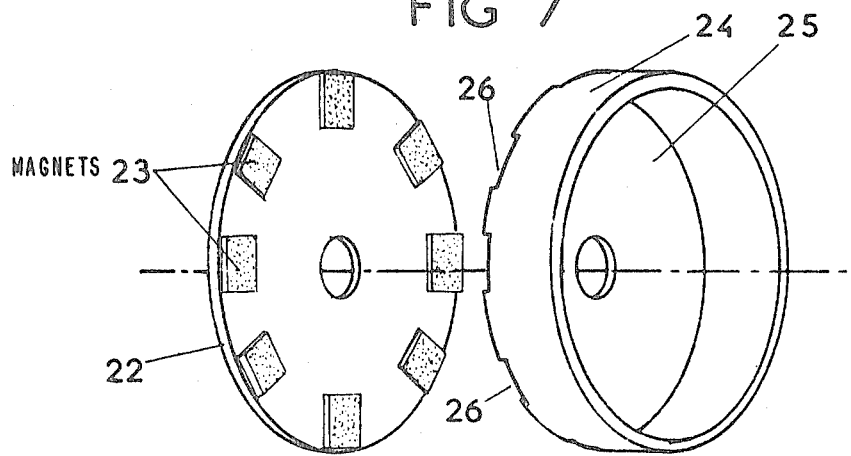
FIG. 7 shows schematically the elements of a clutch disc with magnetic antiskid plates cooperating with a drum provided with notches.

Reference is made to FIG. 7.

Disc 22, fast, which is for example on a crank (not shown) carries a certain number of magnetic projections 23 of frictional material. These projections 23 can vary in number and position on disc 22.

Facing disc 22 is positioned adjacent a flange 25 integral with a winding drum 24. Notches 26 corresponding to reliefs aligned with projections 23 can be made on flange 25.

When, by suitable control, disc 22 is brought near flange 25, projections 23 adhere on said flange 25 and in case of slippage penetrate in notches 26 making all subsequent sliding impossible.

The use of antiskid magnetic projections such as 23 makes it possible to obtain very flat clutching elements. Thus, it is possible in a particularly practical manner to obtain a clutch device whose two elements each comprise a certain number of discs such as 22 and of discs or flanges such as 25. If the adherence is sufficient to eliminate the notches, the antiskid material of the magnetic projections alone prevent the sliding.

It is, however, understood that it is possible to make clutch elements with discs or multiple flanges with many other magnetic means, for example those previously described, these means being associated to antiskid means of any sort, antiskid coatings, notches, and various interfittings.

Figure 8:
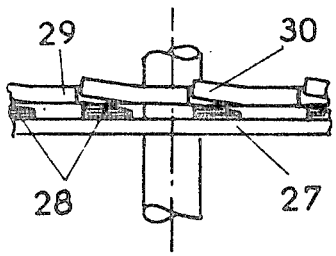
FIG. 8 shows schematically a clutch with magnetic projections forming a slight angle with the plane of the disc.

Reference is made to FIG. 8.

By way of a modification, the magnetic projections 28 positioned on a disc 27 can make a certain angle with the plane of this disc 27. The disc or the opposite flange is cut out or embossed on a level with projections 28 in order to form parts 30 forming with its plane an angle equal to the angle between the projections 28 and disc 27. The portions of disc 29 positioned between the parts 30 remain plane.

There is thus obtained a contact of projections 28 against parts 30 along a plane which is not perpendicular to the axis of rotation. As a result sliding is practically impossible.

Figure 9:
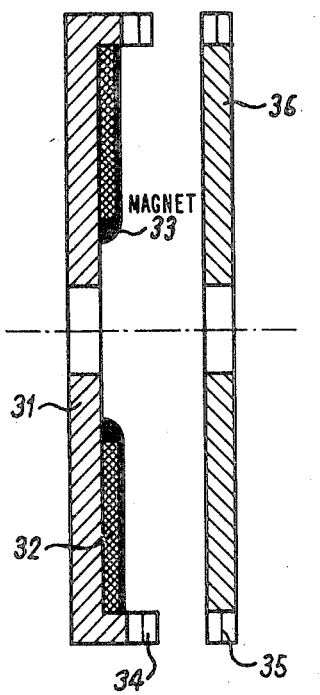
FIG. 9 shows in cross section a clutch with two discs one of which is equipped with magnetic projections and provided with a ring which can mesh with toothing on the other.

Reference is made to FIG. 9.

By way of a modification, the clutch device can comprise a disc 31 of metal or of synthetic material and carrying areas of magnetized ferrite 32 embedded in a layer 33 of antiskid material of natural or synthetic rubber for example. Disc 31 can include axially extending teeth 34 cooperating with recesses 35 of disc 36 against which is applied disc 31. The teeth can be replaced by studs.

Figure 10:
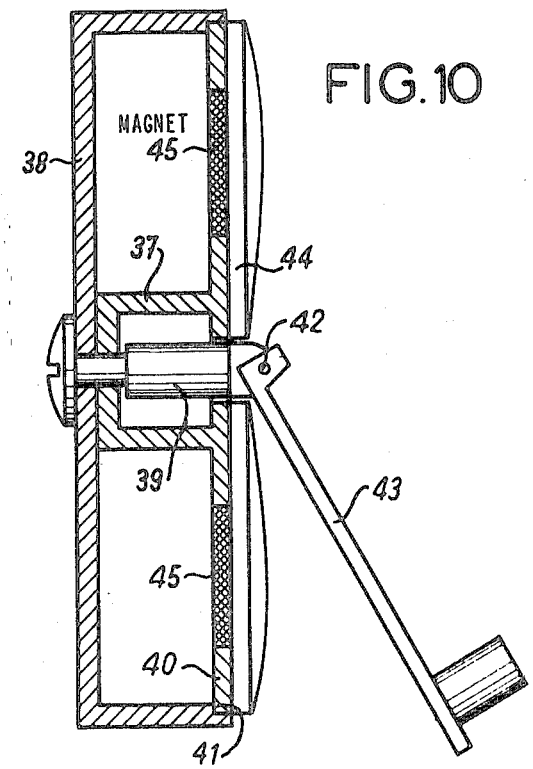
FIG. 10 shows in axial cross section an instrument with a ferromagnetic crank.
Figure 11:
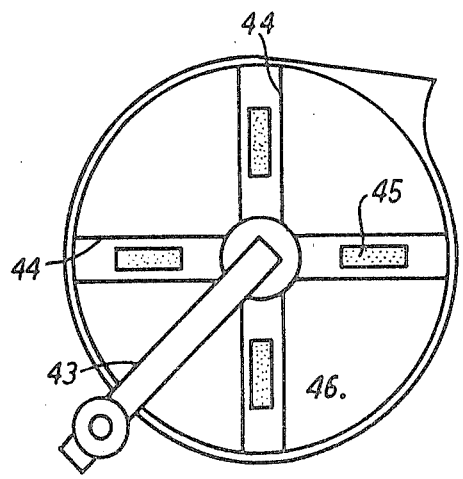
FIG. 11 shows a view of the magnetized flange of the instrument of FIG. 10.

Reference is made to FIGS. 10 and 11.

The linear measuring instrument shown comprises a drum 37 on which is wound a measuring tape (not shown).

The drum 37 turns inside a casing 38 around a shaft 39 which can turn on itself inside said casing 38. A disc or flange 40 of any material, for example synthetic, is integral with drum 37. This disc 40 can be guided in known manner along its periphery by a circular groove 41 of casing 38.

Shaft 39 comprises at one end a small perpendicular shaft 42 around which can pivot the arm of a crank 43. This crank 43 is made of ferromagnetic material.

The disc 40 is itself divided into a certain number of radial grooves 44 with smooth edges in which can be received at least partially the arm of crank 43. The bottom of these grooves 44 is provided with one or several magnets or magnetized parts 45.

To drive drum 37, it suffices to apply handle 43 in driving position against disc 40 and to turn the handle 43 until its arm is aligned with groove 44. At this moment, the ferromagnetic arm of handle 43 is attracted by magnet 45 and can no longer accidentally become disengaged from groove 44. This groove 44 additionally prevents all slip of crank arm 43 relative to disc 40. The disconnection of the crank takes place by rotating the crank by 180° from its driving position. The shaft 42 being staggered relative to the sides of crank 43, the latter can no longer penetrate into grooves 44.

This particularly advantageous concept makes it possible to obtain a magnetic clutching while reducing to a strict minimum the magnetic and ferromagnetic elements, the flange 40 being of synthetic material.

The sectors 46 of flange 40 located between grooves 44 can, in a modification, have a truncated surface inclined towards the center of said flange 40. Such an arrangement makes it possible for the arms of cranks 43 to slide easily in the groove 44 during driving of drum 37.

Naturally, it is also possible to provide, in a modification, a crank arm which has magnetized projections on one or two sides, or a crank with a magnet passing through the arm of the crank and cooperating with a disc provided with radial grooves. The disc can be of ferromagnetic material or synthetic material, only the bottom of the grooves being in that case of ferromagnetic material.

The crank can be maintained in inoperative position by means of a special magnet or a magnet which traverses it and cooperates with a ferromagnetic part positioned on the handle or the body of the winder. The magnet or magnetic projection can be positioned in the handle or the body of the winder and cooperate with a ferromagnetic part positioned on the handle or with the crank itself if the same is made of ferromagnetic material.

Figure 12:
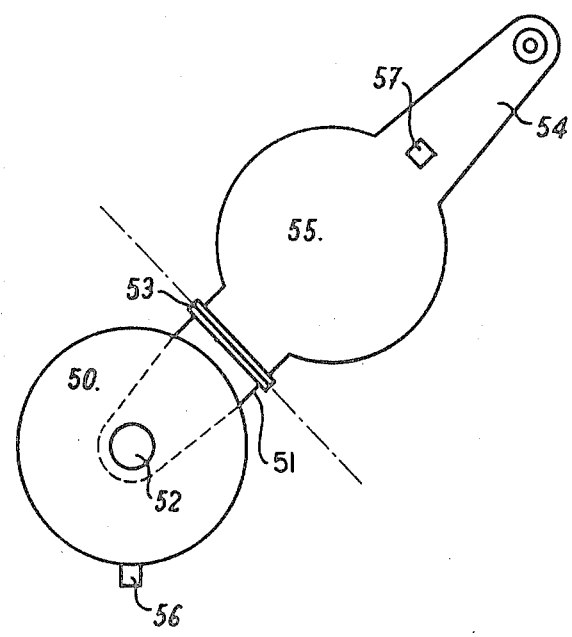
FIG. 12 shows a handle with a flange which can cooperate with a magnetic flange of the drum.

Reference is made to FIG. 12.

In a modification a magnetized disc or flange, or a ferromagnetic member 50 fast of the winding drum of the tape, is positioned outside the instrument. A part 51 freely mounted around shaft 52 comprises a hinge 53 around which can pivot a crank 54 equipped with a ferromagnetic or magnetic disc 55 which can be applied against the magnetic or ferromagnetic flange 50 which can be coated with an antiskid layer. In this manner the magnetic contacting surface is increased considerably.

The flange 50 can comprise a stud 56 which can become lodged in a housing 57 of crank 54 thereby avoiding all slippage of the magnetic clutch thus made. Any other mechanical safety system for avoiding slippage can be used such as gullet gear teeth, of several studs, etc. This mechanical system can be such that it only prevents slipping in the rotational direction corresponding to the winding of the graduated tape, which prevents the crank from turning in the wrong direction. In a modification discs 50 and 55 can be reduced to complementary half discs or any other geometrical shape.

Although the invention has been described with respect to a particular embodiment thereof, it is understood that the same is in no way limited thereto and that there can be brought to it all modifications of shape or materials, without thereby departing from its framework or scope.

What is claimed is:

1. A clutch for a tape-measuring instrument, comprising a drum having a front flange, said flange having a radial groove and having a magnet in the bottom of said groove, a driving shaft having said drum mounted thereon for free rotation, a ferromagnetic crank for rotating said shaft, and means pivotally connecting said crank to said shaft for pivotal movement about an axis perpendicular to the axis of said shaft, said crank being pivotable for alignment with and insertion in said groove, wherein said magnet retains said crank in said groove for rotation to drive said drum.

2. The invention as set forth in claim 1, wherein the pivoting axis of said crank is offset relative to a line equidistant from two sides of said crank.

3. The invention as set forth in claim 2, wherein said flange has a plurality of said radial grooves, said flange is divided into sectors located between said radial grooves, and said flange has an outwardly curved truncated surface.

4. The invention as set forth in claim 1, wherein said means pivotally connecting said crank to said shaft comprises a pin connected to said crank and connected to said shaft at right angles therewith.

5. A clutch for a tape-measuring instrument, comprising a drum having a front flange, a driving shaft having said drum mounted thereon for free rotation, a crank for rotating said shaft, and means pivotally connecting said crank to said shaft for pivotal movement about an axis perpendicular to the axis of said shaft, wherein said crank has at least one magnetized pole and said drum has at least one ferromagnetic element having housing means adapted to receive said crank, wherein said magnetized pole retains said crank in said housing means for rotation to drive said drum.

6. A clutch according to claim 5 wherein said ferromagnetic element is a disc, said housing means is defined by at least one radial groove in said disc, and wherein said groove has open ends to receive said crank.

7. A clutch for a tape-measuring device, comprising a drum, a shaft having said drum mounted thereon, a magnetic disc fixed on said drum for rotation therewith, a crank having a ferromagnetic disc mounted thereon, and a hinge freely journaled on said shaft and connected to said crank, wherein magnetic attraction between said discs causes said drum to rotate with said crank.

8. A clutch for a linear measuring instrument comprising a rotatable drive shaft, rotatable driving and driven elements, mounting means for fixing said driving element to said shaft and for holding said driven element on said shaft for axial movement thereon and for free rotation thereabout, and a plurality of magnets fixed to one of said elements and projecting outwardly therefrom toward the other of said elements, said other element comprising a ferromagnetic disc having a plurality of recesses therein for receiving said projecting magnets when said clutch is engaged to ensure rotation of said driven element with said driving element during such engagement.

* * * * *